United States Patent
Izenson et al.

(10) Patent No.: US 11,586,618 B2
(45) Date of Patent: Feb. 21, 2023

(54) QUERY PARSING FROM NATURAL LANGUAGE QUESTIONS SUPPORTED BY CAPTURED SUBJECT MATTER KNOWLEDGE

(71) Applicant: Visa International Service Association, San Francisco, CA (US)

(72) Inventors: Martin Izenson, Foster City, CA (US); Prashant Trivedi, Foster City, CA (US); Timothy Gunther, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 132 days.

(21) Appl. No.: 17/127,471

(22) Filed: Dec. 18, 2020

(65) Prior Publication Data
US 2021/0191926 A1 Jun. 24, 2021

Related U.S. Application Data

(60) Provisional application No. 62/951,226, filed on Dec. 20, 2019.

(51) Int. Cl.
*G06F 16/242* (2019.01)
*G06N 5/04* (2006.01)
*G06N 20/00* (2019.01)
*G06F 16/248* (2019.01)

(52) U.S. Cl.
CPC .......... *G06F 16/243* (2019.01); *G06F 16/248* (2019.01); *G06N 5/04* (2013.01); *G06N 20/00* (2019.01)

(58) Field of Classification Search
USPC ......................................................... 707/705
See application file for complete search history.

(56) References Cited

U.S. PATENT DOCUMENTS

| | | | |
|---|---|---|---|
| 9,639,889 B2* | 5/2017 | Babiarz | G06Q 30/0643 |
| 2008/0221892 A1* | 9/2008 | Nathan | G06F 40/35 |
| | | | 704/9 |
| 2011/0040602 A1* | 2/2011 | Kurani | G06Q 30/0203 |
| | | | 705/14.19 |

(Continued)

OTHER PUBLICATIONS

"DatAI Intelligent Querying Assistant", Available Online at: https://visa.anaqua.com/anaqua/Survey/SurveyPopup.aspx?id=cc8a4dc6-97ed-48aa-84e4-7b9591d8f2cb.

(Continued)

*Primary Examiner* — Cam Linh T Nguyen
(74) *Attorney, Agent, or Firm* — Kilpatrick Townsend & Stockton LLP (57) ABSTRACT

Systems and methods of processing a query from a user. A method includes receiving, by a server computer, an initial question from a client computer. The initial question includes a plurality of words and the server computer can identify a set of words in the plurality of words. Then the server computer can determine a list of clarifying questions based on a subset of the set of words. The server computer presents the list of clarifying questions to the client computer and receiving clarifying answers to the clarifying questions. The server computer determines an answer to the initial question and presents the answer to the client computer.

20 Claims, 7 Drawing Sheets

(56) References Cited

U.S. PATENT DOCUMENTS

| | | | |
|---|---|---|---|
| 2011/0231353 A1* | 9/2011 | Wang | G06Q 10/10 |
| | | | 706/45 |
| 2013/0159404 A1* | 6/2013 | Pfaff | G06F 16/248 |
| | | | 709/204 |
| 2016/0063097 A1* | 3/2016 | Brown | G06K 9/6254 |
| | | | 707/737 |
| 2016/0259775 A1 | 9/2016 | Gelfenbeyn et al. | |
| 2018/0329993 A1 | 11/2018 | Bedadala et al. | |
| 2019/0110728 A1* | 4/2019 | Sbodio | G09B 7/00 |
| 2020/0167834 A1* | 5/2020 | Matsuoka | G06Q 30/0278 |

OTHER PUBLICATIONS

Gupta et al., "Semantic Parsing for Task Oriented Dialog Using Hierarchical Representations", Conference on Empirical Methods in Natural Language Processing (EMNLP) 2018, Available Online at: https://arxiv.org/pdf/1810.07942.pdf, Oct. 18, 2018, 6 pages.

Roukos, "Advancing Natural Language Processing (NLP) for Enterprise Domains", Towards Data Science, Available Online at: https://towardsdatascience.com/advancing-natural-language-processing-nlp-for-enterprise-domains-1060052294a, Aug. 1, 2019.

* cited by examiner

QUERY PARSING FROM NATURAL LANGUAGE QUESTIONS SUPPORTED BY CAPTURED SUBJECT MATTER KNOWLEDGE

CROSS-REFERENCE TO RELATED APPLICATIONS

This application claims priority to U.S. Provisional Patent Application No. 62/951,226, filed on Dec. 20, 2019, the disclosure of which is herein incorporated by reference it its entirety for all purposes.

BACKGROUND

In order to query a large database, or an structure like a data warehouse, a user needs to have knowledge of how that database is structured and what information is in it. For a subject matter expert that interacts with the database regularly, this may not pose any difficulty. However, an inexperienced user may not have the knowledge of how to effectively query the database, or even how to generate an appropriate query. This may result in a lot of wasted time and resources as the user attempts to determine an answer to their query, potentially making many repeated calls to the database.

One solution for the user may be to ask a subject matter expert who can assist in determining a response. The expert, or even a team of experts, cannot be expected to answer assist every user with every query question. An automated system that attempts to assist users may not provide effective or consistent results. Providing users with different responses to the same question can result in later complications.

Embodiments address these and other problems individually and collectively.

BRIEF SUMMARY

One embodiment includes a method comprising receiving, by a server computer, an initial question comprising a plurality of words from a client computer and identifying, by the server computer, a set of words in the plurality of words. The method also includes determining, by the server computer, a list of clarifying questions, based on a subset of the set of words, presenting, by the server computer, the list of clarifying questions to the client computer, and receiving, by the server computer, clarifying answers to the clarifying questions. The method also includes determining, by the server computer, an answer to the initial question and presenting, by the server computer, the answer to the client computer.

Another embodiment includes a server computer comprising a processor and a computer-readable medium comprising computer code executable by the processor to implement a method that includes receiving an initial question comprising a plurality of words from a client computer and identifying a set of words in the plurality of words. The method also includes determining a list of clarifying questions, based on a subset of the set of words, presenting the list of clarifying questions to the client computer, and receiving clarifying answers to the clarifying questions. The method also includes determining an answer to the initial question and presenting the answer to the client computer.

Another embodiment includes a method comprising sending, by a client computer, an initial question comprising a plurality of words to a server computer. The method also includes receiving, by the client computer from the server computer, a list of clarifying questions and sending, by the client computer to the server computer, clarifying answers to the clarifying questions. The method also includes receiving, by the client computer, an answer.

DETAILED DESCRIPTION

Embodiments enable an artificial intelligence program on a server computer to learn from and mimic the expertise of a subject matter expert to answer user questions. A user can send a question, in natural language (e.g., as an English sentence), to the server computer. A server computer according to embodiments can select a list of clarifying questions that it has developed to present to the user and may be similar to and/or based on questions that a subject matter expert might ask. The clarifying questions may disambiguate terms in the question that have been identified as ambiguous. The clarifying questions can also prompt the user to be more specific about the question. The clarifying questions may be about things that the user was unaware of, or would not have thought to ask. To assist the user in answering the question, embodiments can provide recommended answers to the clarifying questions, based on reference data or similar questions asked by other users.

In some cases, the clarifying questions may not be sufficient for the server computer to determine what the user was asking. The server computer may then select another list of clarifying questions to present to the user and repeat the process. In other cases, the user may not be able to satisfactorily answer the clarifying questions. The question may alternatively be passed to an assistant (e.g., a subject matter expert) who can answer the question for the user. The question and the set of clarifying questions can be used as negative training examples for a machine learning model to refine the clarifying questions and develop new clarifying questions.

Prior to discussing embodiments of the invention, some terms can be described in detail.

A "user" may include an individual or a computational device. In some embodiments, a user may be associated with one or more personal accounts and/or mobile devices. In some embodiments, the user may be an analyst, account holder, or consumer.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU, which comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, models that classify data by establishing a gap or boundary between inputs of different classifications, as well as neural networks, which are collections of artificial "neurons" that perform functions by activating in response to inputs.

A "machine learning classifier" may include a machine learning model that can classify input data or feature vectors. For example, an image classifier is a machine learning model that can be used to classify images, such as images of animals. As another example, a news classifier is a machine learning model that can classify news articles as "real news" or "fake news." As a third example, an anomaly detector, such as a credit card fraud detector, can classify input data such as credit card transactions as either normal or anomalous. The output produced by a machine learning classifier may be referred to as "classification data." Machine learning classifiers may also include clustering models, such as K-means clustering. Clustering models can be used to partition input data or feature vectors into multiple clusters. Each cluster may correspond to a particular classification. For example, a clustering model may accept feature vectors corresponding to the size and weight of dogs, then generate clusters of feature vectors corresponding to small dogs, medium dogs, and large dogs. When new input data is included in a cluster (e.g., the small dogs cluster), the clustering model has effectively classified the new input data as input data corresponding to the cluster.

A "feature vector" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex input, such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

A "label" may be an output of a machine learning model. A label may be a numerical value, in particular a probability, or a classification. For example, labels may be fraud, non-fraud, spam, non-spam, dog, and cat. Labels may be output as a probability, such as 95% spam and 5% non-spam.

An "initial question" may be a question asked by a user. The initial question may be a request for a synthesized piece of information. The initial question may be a request for information from a database. The initial question may or may not be formatted as a database request, or may be in natural language.

A "clarifying question" may be a question presented to clarify a piece of information. A clarifying question may be presented to a user to gain information about a question asked by the user. Clarifying questions may be in natural language (e.g., as an English sentence).

A "clarifying answer" may be a response to a clarifying question. Clarifying answers may be provided by a user. The clarifying answer may have information about a question asked by the user. A clarifying answer may be in natural language (e.g., as an English sentence).

A "partial database query" may be a database query that is missing one or more elements. As an example, a partial database query may be a database query that is missing one or more filter criteria. In some cases, a partial database query may be a valid database query but may result in a different (e.g., broader) result than desired. In some embodiments, a database query may be an SQL query. As an example, a partial database query (as an SQL query) based on the initial question "How many transactions were made at Merchant A in 2018?" may be "SELECT ( ) FROM ( ) WHERE merchant="Merchant A" AND year 2018." A database query based on the same initial question may be "SELECT authTransactions FROM transactionDatabase WHERE merchant="Merchant A" AND year 2018."

A "peer recommendation" may be a recommended answer to a question based on data from other users.

Figure 1:
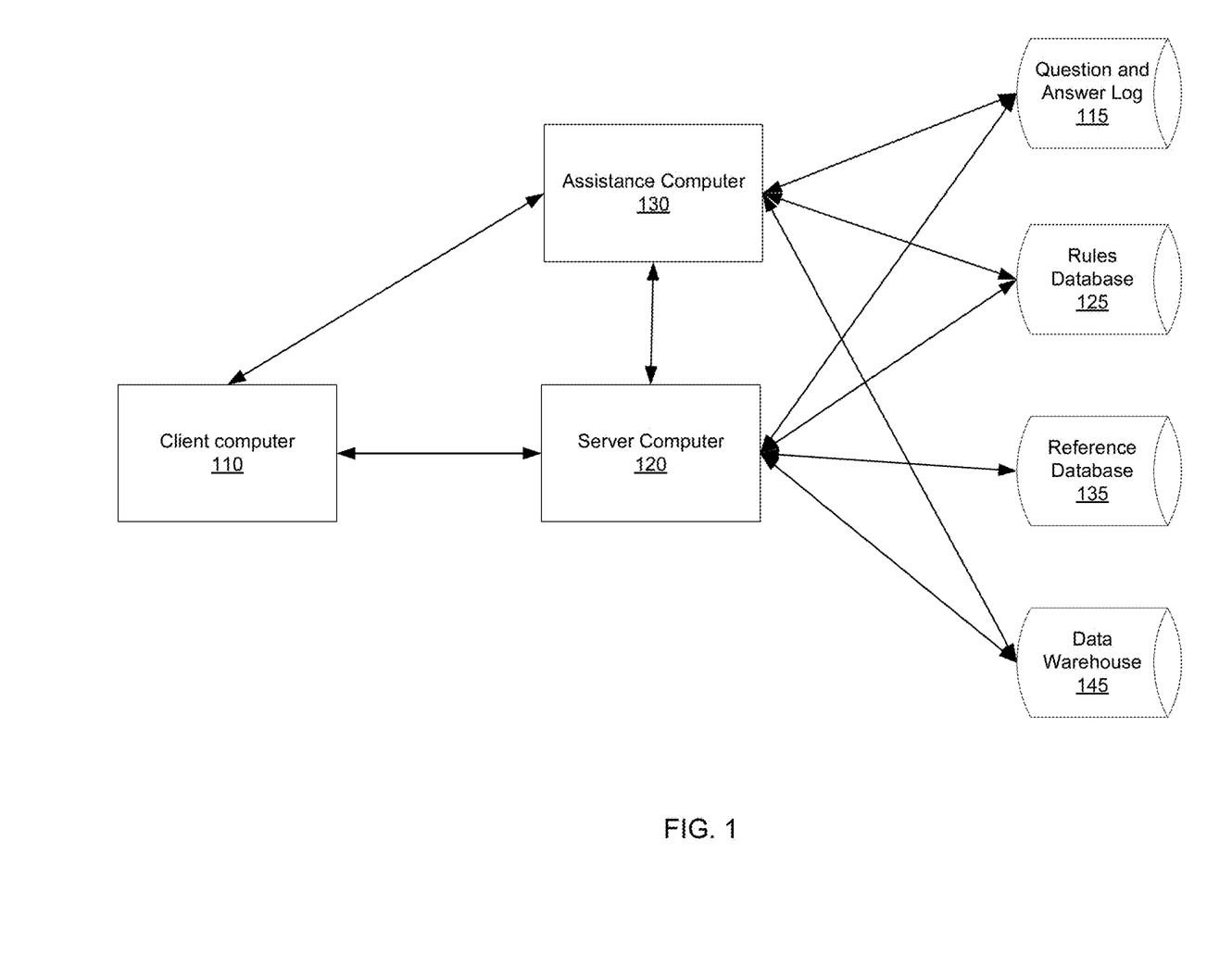
FIG. 1 shows a diagram of a system according to embodiments.

FIG. 1 shows a diagram of a system according to embodiments. The system may comprise a client computer 110, a server computer 120, and an assistance computer 130. The system may also comprise a question and answer log 115, a rules database 125, a reference database 135, and a data warehouse 145. Any of the devices in FIG. 1 may be in communication via a suitable communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Client computer 110 may send queries to the server computer 120. The client computer 110 can be operated by a user. In some embodiments, the client computer 110 may operate a thin client of the server computer 120. The client computer 110 may also display a user interface of the server computer (e.g., an application, a website). The client computer 110 may be a laptop, a mobile device, a desktop computer, etc. The client computer 110 can have input devices, such as a keyboard and/or microphone, for the user to enter a query in natural language.

The client computer can comprise a processor and a computer-readable medium comprising code executable by the processor to implement a method that includes sending, by a client computer, an initial question comprising a plurality of words to a server computer; receiving, by the client computer from the server computer, a list of clarifying questions; sending, by the client computer to the server computer, clarifying answers to the clarifying questions; and receiving, by the client computer, an answer.

Server computer 120 may be a computer that can perform processing of initial questions and determine clarifying questions to ask about the query. The server computer 120 may provide query processing and may have the ability to process an initial question, determine clarifying questions, and use machine learning to process information about the initial questions. In some embodiments, server computer 120 may have the capability to authenticate users. In some embodiments, there may be one or more computers in operative communication that perform the processes of server computer 120.

Assistance computer 130 may be a computer operated by an assistant that can answer user questions. For example, an assistant may be a customer service representative or subject matter expert. The assistance computer 130 may be in communication with the same databases as server computer 120 (e.g., question and answer log 115, rules database 125, reference database 135, and data warehouse 145) and may be able to manually update the databases.

Question and answer log 115 may comprise information about questions sent to server computer 120 and responses determined for each question. Question and answer log 115 may additionally comprise information about the success of each query response. For example, the question and answer log 115 can contain information about the clarifying questions, the clarifying answers, whether the clarifying questions were sufficient to determine a database query to answer the initial question, and whether the response to the initial question was satisfactory to the user. The data in question and answer log 115 may be used as training data for a machine learning model to refine the clarifying questions that are asked for future queries.

Rules database 125 may comprise rules to determine which clarifying questions are asked based on the initial question. For example, some terms that commonly appear in queries may be ambiguous to server computer 120. There may be rules for those terms with clarifying questions to disambiguate the term. For example, questions that include "transaction" may trigger a rule to clarify settled transactions or authorized transactions. As another example, there may be rules triggered by an initial question comprising a word about time (e.g., "this month", "last year", "on weekends"). Some rules in rules database 125 may be based on words in the initial questions. Other rules may be standard, such as a rule for a clarifying question asking what format a report should be in.

Reference database 135 may comprise supplemental information. The supplemental information may be used to generate potential answers to clarifying questions. As an example, the reference database 135 may include metadata about the databases and/or the data warehouse 145 (e.g., names of databases, datatypes stored in databases, relationships within and between databases) that can be used to generate potential answers to clarifying questions about what database to search. As another example, the reference database 135 may include information about merchants with data in the data warehouse 145 (e.g., parent organizations, store locations) that can be used to generate potential answers to clarifying questions about a merchant term in an initial question. In some embodiments, the reference database 135 may be part of data warehouse 145.

Data warehouse 145 may store the information being requested by the query. The data warehouse 145 may comprise a plurality of databases. The databases may be integrated to bring together data from a plurality of sources. The data in the data warehouse 145 may include, for example, transaction data, organizational data, user data, etc.

Figure 2:
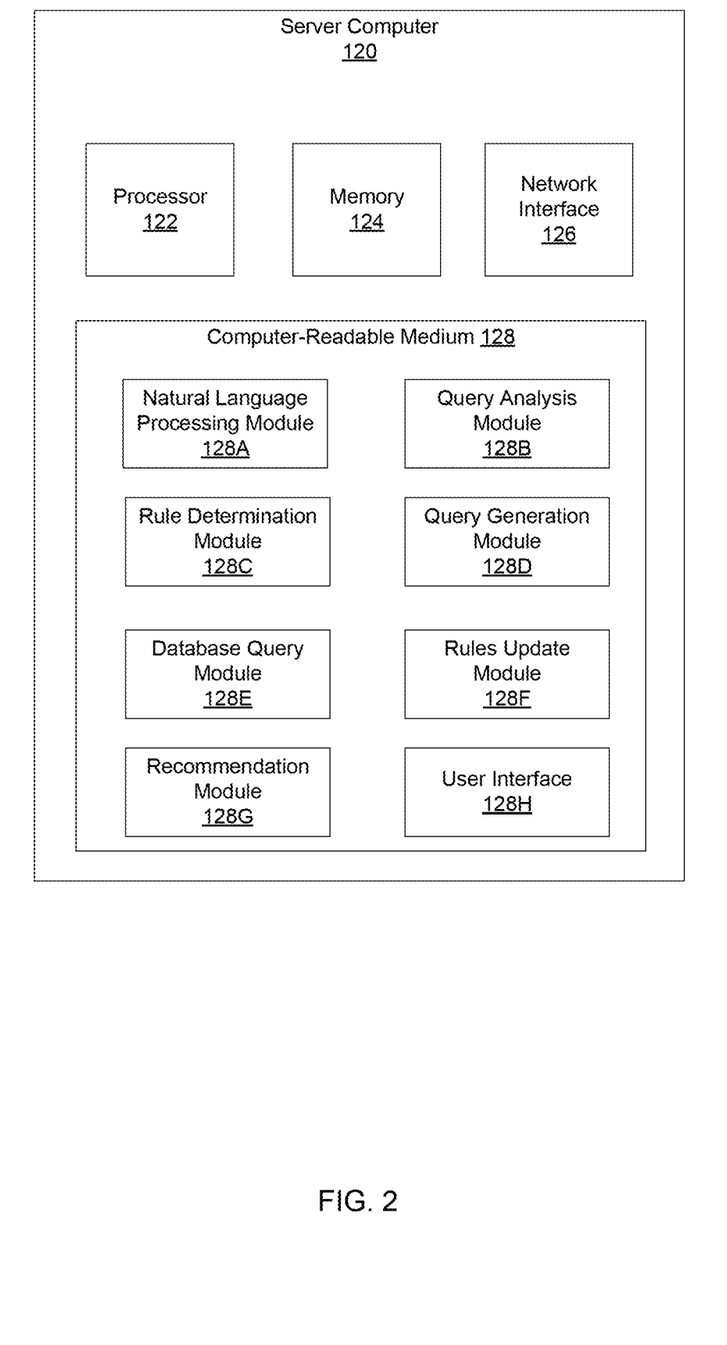
FIG. 2 shows a block diagram of a server computer according to embodiments.

FIG. 2 is a block diagram of a server computer 120. Server computer 120 may comprise a processor 122, a memory 124, a network interface 126, and a computer-readable medium 128. Computer-readable medium 128 may comprise a natural language processing module 128A, a query analysis module 128B, a rule determination module 128C, a query generation module 128D, a database query module 128E, a rules update module 128F, recommendation module 128G, and a user interface 128H.

The processor 122 may be implemented as one or more integrated circuits (e.g., one or more single core or multicore microprocessors and/or microcontrollers). The processor 122 may be used to control the operation of the server computer 120. The processor 122 can execute a variety of programs in response to program code or computer-readable code stored in memory 124. The processor 122 may include functionality to maintain multiple concurrently executing programs or processes.

The memory 124 may be implemented using any combination of any number of non-volatile memories (e.g., flash memory) and volatile memories (e.g., DRAM, SRAM), or any other non-transitory storage medium, or a combination of media.

Network interface 126 may be configured to connect to one or more communication networks to allow server computer 120 to communicate with other entities such as client computer 110, assistance computer 130, etc. For example, communication with the client computer 110 can be direct, indirect, and/or via an API.

Computer-readable medium 128 may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 128 may be any combination of such storage or transmission devices.

Natural language processing module 128A, in conjunction with processor 122, may process natural language inputs, including initial questions and clarifying answers. Natural language processing module 128A may identify natural language tokens in the input. A token may be a unit of analysis for natural language (e.g., words, phrases). For example, natural language processing module 128A may divide the input at spaces and identify the set of words in the input. In some embodiments, natural language processing module 128A may comprise an artificial intelligence model. Natural language processing module 128A may also identify labels for the tokens in the input. For example, a token "Starbucks" may be labeled as a merchant-related token.

Query analysis module 128B, in conjunction with processor 122, may attempt to generate a database query with identified tokens from the natural language processing module 128A. Query analysis module 128B may have templates of database queries. Query analysis module 128B may use the tokens to identify an appropriate database query template. The query analysis module 128B may then attempt to form a database query with the tokens and the database query template and form a partial database query. Elements of the database query template that are not filled in may be determined as tokens that require clarifying questions to identify or disambiguate. In some embodiments, the database query may be a SQL query.

Rule determination module 128C, in conjunction with processor 122, may apply a rule model to the initial question and the tokens identified by natural language processing module 128A and query analysis module 128B. Rule determination module 128C may have rules based on the entire initial question, one or more of a set of words identified in the initial question, or other criteria related to the initial question. For example, there may be a rule for "merchant." Initial questions that contain the word "merchant", or an words identified as relating to a merchant, may have a rule to present an initial question to determine whether "merchant" refers to a single brick and mortar store or a company. As another example, rule determination module 128C may determine a clarifying question to determine a database to query to answer the initial question.

Query generation module 128D, in conjunction with processor 122, may generate database queries. The database query may be generated with a partial database query and clarifying answers. The query generation module 128D may receive tokens from the clarifying answers, processed by the natural language processing module 128A, and fill them in to the partial database query. If the partial database query cannot be completed (e.g., there are still missing elements, tokens have not been fully disambiguated), then the query generation module 128D may send the partial database query, updated with the tokens from the clarifying answers, to the rule determination module 128C to determine additional clarifying questions.

Database query module 128E, in conjunction with the processor 122, may query one or more databases with the database query to determine an answer to the initial question. For example, the database query module 128E may send the database query to a transaction database in a data warehouse to determine a total number of transactions made at a merchant. The database in the data warehouse that the query is to be sent to may be indicated in the database query. Additionally, or alternatively, the database that the query is to be sent to may be indicated in metadata. For example, there may be a tag indicating the particular database.

Rules update module 128F, in conjunction with the processor 122, may determine updates to the list of clarifying questions and rules. Rules update module 128F may comprise one or more machine learning models. The machine learning models may analyze data in the question and answers log 115 (e.g., initial questions, clarifying questions, clarifying answers, answers, success rates) to determine effectiveness of existing clarifying questions and new clarifying questions. Rules update module 128F may determine new rules that can address the changes to the list of clarifying questions. Additionally, or alternatively, rule update module 128F can make changes to the rules model to reflect the changes to the list of clarifying questions.

Recommendation module 128G, in conjunction with the processor 122, may generate recommended clarifying answers to the clarifying questions and present them to the client computer. For example, a clarifying question may ask what database should be used to complete the query in the initial question, with options including database A and database B. The recommendation module 128G may determine that 90% of similar initial questions use database A, and thus database A may be presented with the clarifying question as a recommended clarifying answer. In some embodiments, the recommended clarifying answers may be default values or industry standards.

User interface 128H, in conjunction with the processor 122, can present a user interface to the client computer. The user interface may be presented though, for example, a website or a desktop application.

Figure 3:
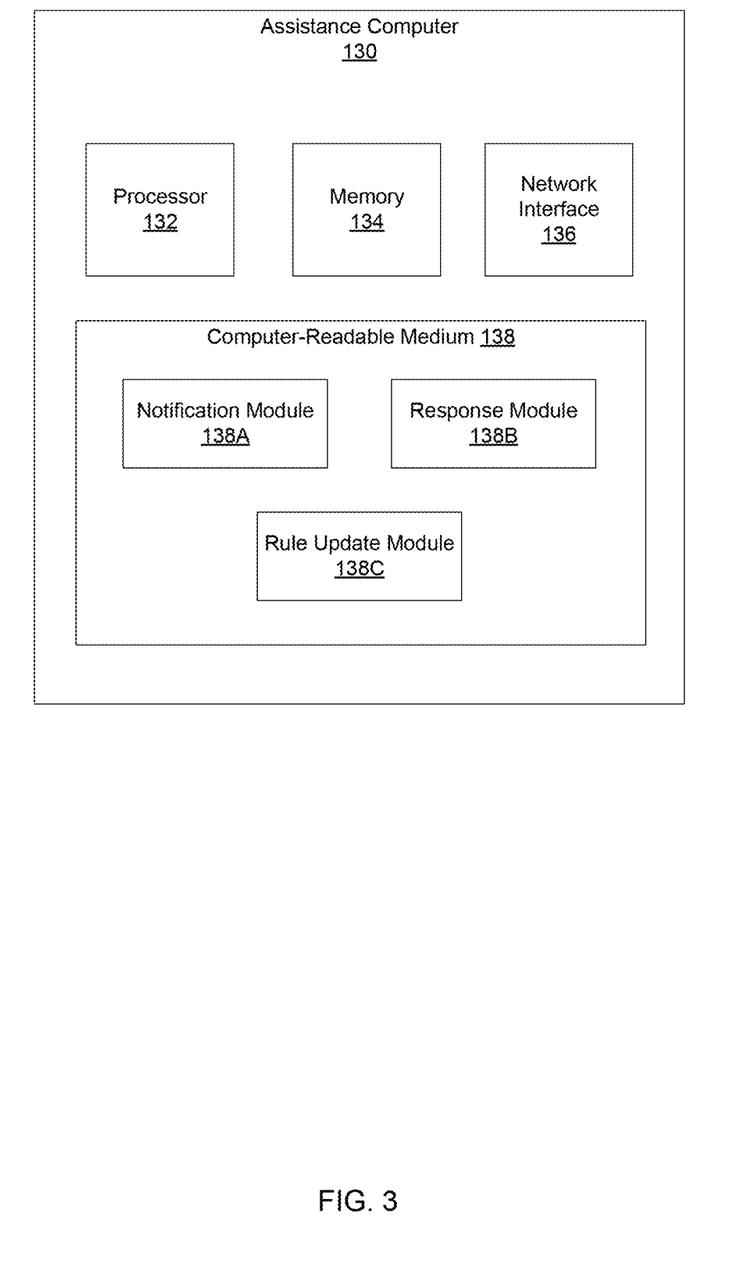
FIG. 3 shows a block diagram of an assistance computer according to embodiments.

FIG. 3 is a block diagram of an assistance computer 130. Assistance computer 130 may comprise a processor 132, a memory 134, a network interface 136, and a computer-readable medium 138. Computer-readable medium 138 may comprise a notification module 138A, a response module 138B, and a rule update module 138C.

The processor 132, the memory 134, the network interface 136, and the computer-readable medium 138 may be similar to the corresponding components of the server computer 120 of FIG. 2.

Notification module 138A, in conjunction with the processor 132, may notify the assistant that there is an initial question that can be answered by the assistant. Notification module 138A may receive an initial question from the server computer 120 after the user has indicated that they want to communicate with an assistant. This may be, for example, because clarifying questions or the answer from the server computer 120 were not satisfactory, or because they do not know how to answer the clarifying questions. After receiving the initial question, the notification module 138A may then send a notification to the assistant. The notification may be, for example, an email, a text message, or a push notification.

Response module 138B, in conjunction with the processor 132, may send an answer to the initial question to the client computer. The answer may be generated by the assistant. For example, the assistant may research the initial question, determine an answer, and enter the answer into the assistance computer 130. The response module 138B may then send the answer to the server computer 120 to be sent to the client computer. In some embodiments, the answer may be sent to the client computer directly.

Rule update module 138C, in conjunction with the processor 132, may update the rules database 125. The assistant may determine one or more new rules or clarifying questions that should be added to the rules database 125 and enter them into the assistant computer 130. The rule update module 138C may then update the rules database 125 with the one or more new rules. For example, if a user indicates that a clarifying question was confusing and prevented them from being able to answer. The assistant may then edit the clarifying question and update the rules database 125 accordingly.

Figure 4:
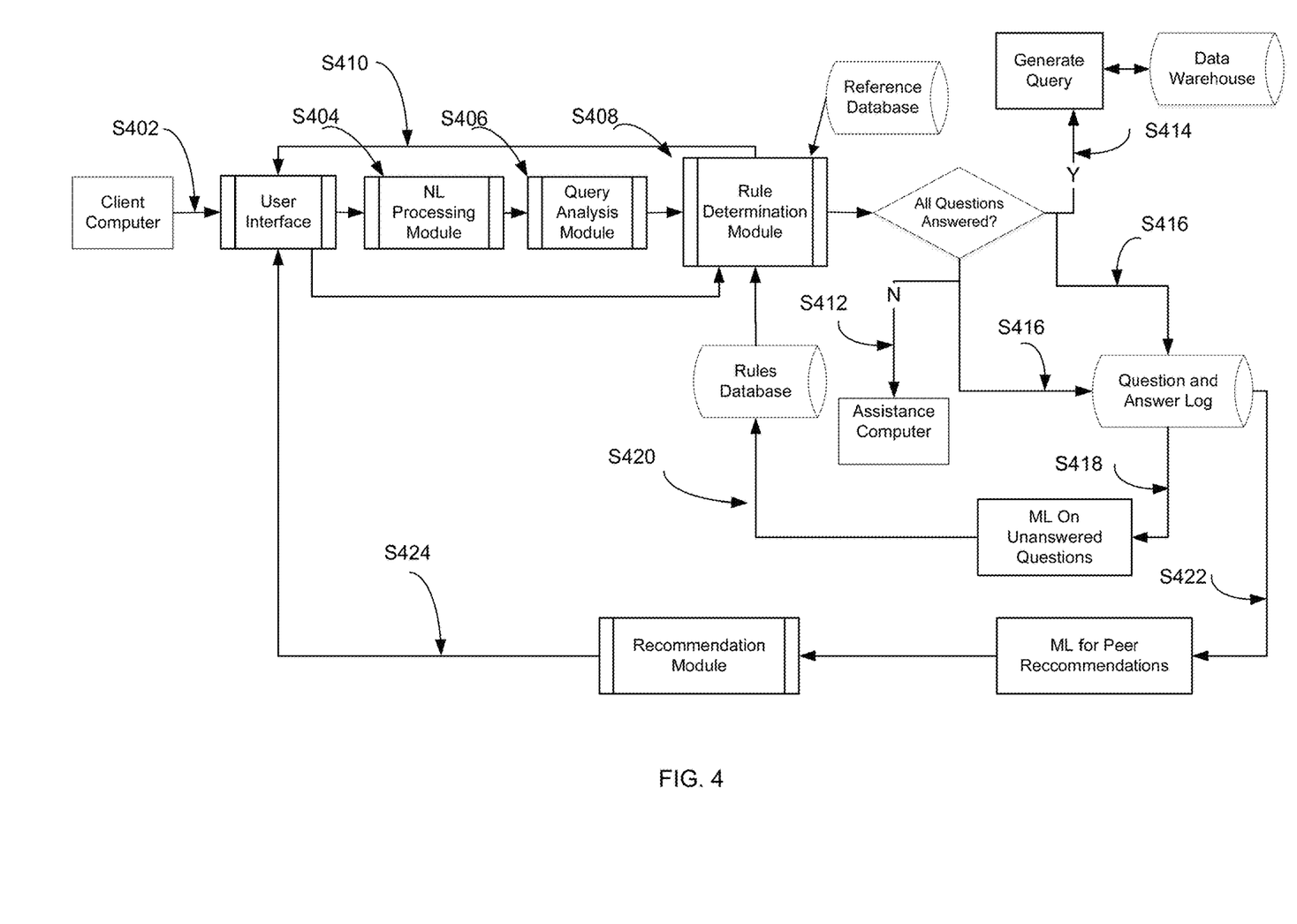
FIG. 4 shows a diagram of a query processing process according to embodiments.

FIG. 4 is a sequence diagram of a query processing process according to embodiments.

In step S402, the server computer can receive an initial question comprising a plurality of words from a client computer. A user of the client computer may enter the initial question into a user interface. The user interface may be, for example, a website or a desktop application. The initial question may be in natural language. For example, the user may type in a question such as "How many transactions were made at Merchant A last year?" As another example, the user may speak the question and it may be recorded by a speech recognition program. In some embodiments, the user, or the client computer, may be authenticated before receiving the initial question. For example, the user may enter a username and password before accessing the user interface to enter the initial question. As another example, the client computer may exchange a token with the server computer to authenticate the client computer and establish a secure connection.

In step S404, the initial question may be sent to a natural language (NL) processing module to identify a set of words in the plurality of words. For example, given the initial question "How many transactions were made at Merchant A in 2018?" the NL processing module may identify "how many", "transactions", "Merchant A", and "2018" as a set of words. The NL processing module may generate natural language tokens for the set of words in the initial question. The NL processing module may also identify tags for the set of words. For example, "last year" may be tagged as a time token. As another example, "Merchant A" may be tagged as a merchant.

In step S406, the query analysis module can determine a partial database query based on the set of words. The query analysis module may identify a database query template. In some embodiments, the database query template may be a template for a SQL query. For example, a database query template may be "SELECT ( ) FROM ( ) WHERE ( )" The query analysis module can attempt to form a database query with the database query template and the set of words. For example, a partial database query "SELECT ( ) FROM ( ) WHERE merchant='Merchant A' and year=2018" can be formed from the template and the tokens "Merchant A" and "2018" of the initial question "How many transactions were made at Merchant A in 2018?" In some embodiments, the query analysis module can identify a subset of words based on the partial database query. For example, "transactions" can be identified as a subset of the set of words because it is not in the partial database query. The subset of words may be terms in the set of words that are ambiguous. The query analysis module can also identify terms in the database query template that are not filled by the initial question.

In step S408, the rule determination module can determine a list of clarifying questions, based on the subset of the set of words. The rule determination module may use rules from the rules database to determine the clarifying questions. As an example, if a word is tagged as a merchant, there may be a rule to disambiguate the word. For example, if the initial question is "How many transactions were made at Merchant A last year?", the words "Merchant A" may trigger a rule to ask a clarifying questions. The clarifying question may ask if "Merchant A" refers to a particular location of Merchant A or all locations of Merchant A in a region. In another example, the term "transactions" may trigger a rule with a clarifying question to determine if the user wants to define transactions as transactions that have been authorized or transactions that have been settled. In some embodiments, the clarifying questions can be determined based on the authentication of the client computer. For example, the user may be authenticated as an administrator. Then the rule determination module may determine a clarifying question asking whether a public database or a secured database should be used to answer the initial question, while a user that is not an administrator may only have access to the public database.

The rule determination module can also query a reference database. By querying the reference database, the rule determination module can determine potential answers to the clarifying questions. As an example, if a rule determines that a clarifying question is needed to determine what level of organization "Merchant A" refers to, the rule determination module can query the reference database to identify individual location of Merchant A and a parent organization of Merchant A.

In step S410, the list of clarifying questions can be presented to the client computer. The list of clarifying questions can be presenting on the user interface. The potential answers can also be presented on the user interface with the clarifying questions. For example, the potential answers may be presented as a dropdown menu with each clarifying question. There may also be an option for the user to enter a clarifying answer to each clarifying question. If the server computer has determined peer recommendations for one or more of the clarifying questions, the peer recommendations can be presented along with the clarifying questions and potential answers.

The user can enter clarifying answers to the clarifying questions. The user may select potential answers that were presented, or may enter clarifying answers, such as through a text box or a drop down menu. After the server computer receives the clarifying answers to the clarifying questions, the clarifying answers may be sent to the rule determination module. In some embodiments, a clarifying answer may be one option of a list of potential answers (e.g., "authorized transactions" as a response to "What kind of transaction?"), and thus may not need natural language processing. In other embodiments, a clarifying answer may be in natural language (e.g., "I want information about authorized transactions" in response to "What kind of transaction?"). The clarifying answers may then be sent to the NL processing module, the query analysis module, and the rule determination module.

After receiving the clarifying answers, the server computer can determine if all of the clarifying questions have been answered and attempt to determine an answer to the initial question. The server computer can attempt to fill in the partial database query with information (e.g., tokens) from the clarifying answers.

If all the clarifying questions are not answered, in step S412, the server computer can send the initial question to an assistant. The server computer may send the initial question to the assistant through the assistance computer. In some embodiments, the initial question may be sent to the assistant at any time by the user indicating that they would like help. The assistant can then determine the answer and send the answer to the server computer though the assistance computer. After receiving the answer from the assistant, the server computer can present the answer to the client computer. In some embodiments, after receiving the initial question, the assistant can communicate with the user directly.

If all the clarifying questions are answered, in step S414, the server computer can determine a database query based on the partial database query and the clarifying answers. The database query may be, for example, a SQL query. In some embodiments, the server computer may use the natural language tokens generated by the NL processing module from the clarifying answers to fill in the remaining elements of the partial database query. The server computer can then query a data warehouse with the database query. The database query may be sent to a particular database in the data warehouse. The result of the database query may be the answer. The server computer can then present the answer to the client computer. In some embodiments, the answer may be formatted as a report.

In step S416, whether or not all the clarifying questions are answered, the server computer can store the initial question and the answer in the question and answer log. In some embodiments, if the assistant answers the initial question, the assistance computer can store the initial question and the answer in the question and answer log. The clarifying questions and the clarifying answers can also be stored in the question and answer log. An indicator can also be stored in the question and answer log to indicate whether the initial question was answered by the server computer or the assistance computer. Additionally, there may be information about clarifying answers that were answered by the user. For example, the user might have answered half of the clarifying questions before opting to have the initial question be answered by the assistant, so the clarifying answers that were entered may be stored in the question and answer log.

In step S418, a first machine learning model of the server computer can process the information in the question and answer log to generate new clarifying questions. Initial questions that were answered by the server computer may be positive training examples and initial questions that were answered by the assistant may be negative training examples. For example, 70% of initial questions received by server computer that comprise the word "transactions" may result in the server computer not being able to answer the initial question. The first machine learning model may determine that "transactions" is ambiguous and there should be a clarifying question to disambiguate the word. In some embodiments, the first machine learning model may itself also generate the clarifying question. In other embodiments, the first machine learning model may generate the clarifying question by notifying the assistant of the ambiguous term, who may then create the appropriate clarifying question. The first machine learning model may then generate a rule linking the ambiguous term or terms to the new clarifying question. The first machine learning model may be, for example, a deep neural network. The first machine learning model may also determine modifications to existing rules.

The first machine learning model may periodically process the information in the question and answer log. In some embodiments, the information may be processed based on time (e.g., every week), number of initial questions received (e.g., after every 100 initial questions), or after a number of failed initial questions (e.g., after every $10^{th}$ initial question that the server computer is unable to answer).

In step S420, the list of clarifying questions in the rules database can be updated by the first machine learning model of the server computer with the new clarifying questions. The rules database may also be updated with updates to existing rules. For example, new terms may be added as triggers for existing rules.

In step S422, a second machine learning model of the server computer can process the information in the question and answer log to generate a list of peer recommendations. The peer recommendations may be one or more clarifying answers that are often given to a particular clarifying question. The second machine learning model may identify clarifying answers that are associated most often with initial questions that are successfully answered by the server computer. Alternatively, the peer recommendations may be the clarifying answer that is given most often. In some embodiments, the peer recommendation may be an industry standard or default value. The second machine learning model may be, for example, a deep neural network.

In step S424, the server computer can present the list of peer recommendations to the client computer. The list of peer recommendations may be presented on the user interface alongside the prompt for entering clarifying answers. The peer recommendations may also be presented with explanations of why they are being presented (e.g., an indication of what percentage of other users selected that option). The peer recommendations may be stored on the server computer until the user asks a question.

Figure 5:
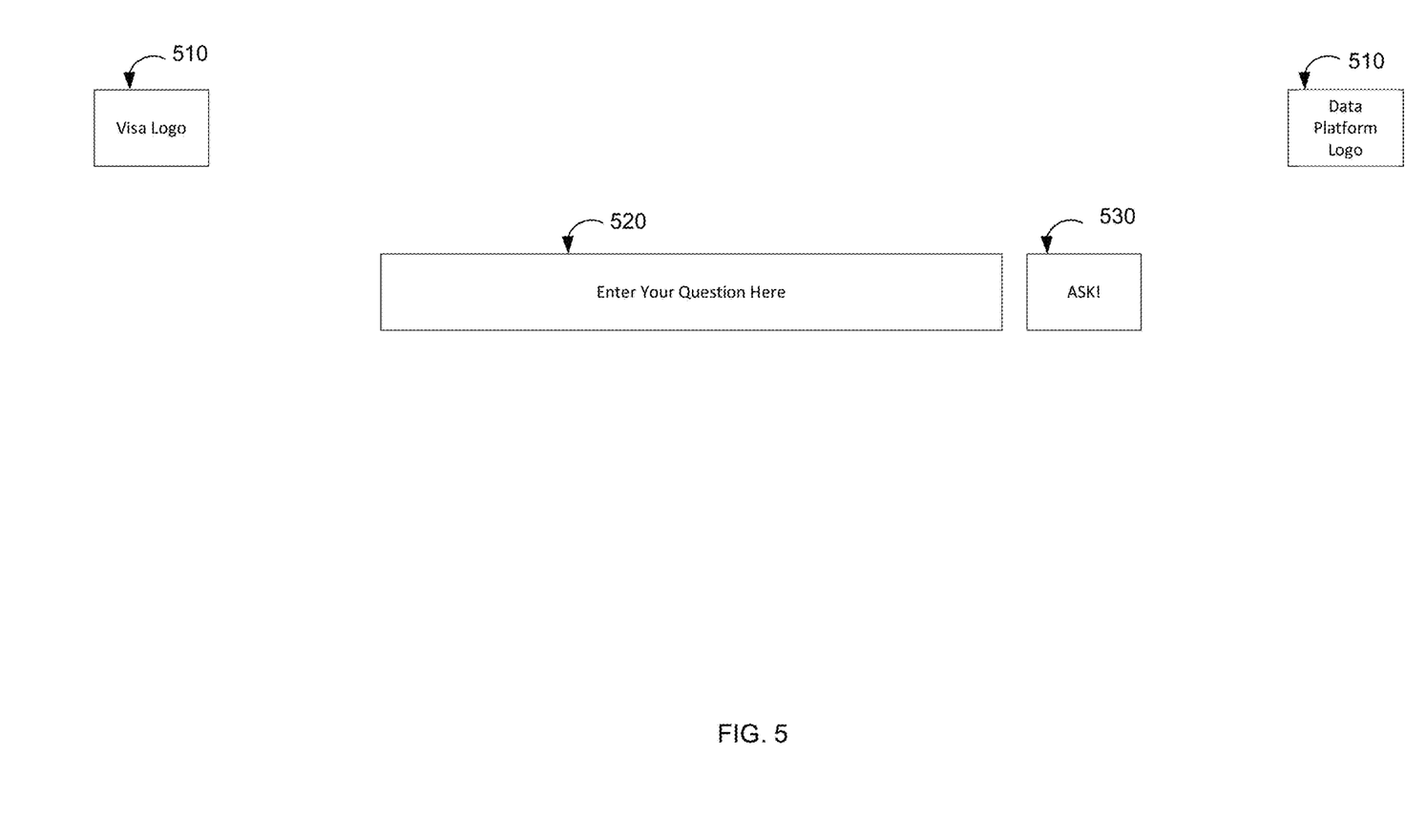
FIG. 5 shows a wireframe diagram of a query entry interface according to embodiments.

FIG. 5 shows a wireframe diagram of a user interface for entering an initial question. The user interface may be, for example, a web page, a mobile app, or an element of a desktop application.

Block 510 may be identifying logos or other branding markers. They may indicate, for example, the data platform providing the question answering service and the organization that maintains the databases (e.g., the question and answer log, the rules database, the reference database, the data warehouse).

Block 520 may be a text box for a user to enter an initial question. The user may be able to enter the initial question in natural language (e.g., English). In some embodiments, block 520 may additionally comprise an icon of a microphone or some other indicator for a user to initiate a voice recording to enter the initial question. A speech recognition program may then translate the voice recording into a text statement and display the text in block 520.

Block 530 may be a button that the user can select to send the initial question to the server computer. The button may be labeled, for example, with "Ask", "Go", "Enter" or some other indication of its purpose. The user may be able to select the button by tapping, clicking, or otherwise interacting with it.

After the user enters the initial question, the initial question may be sent to a server computer. The server computer can process the initial question and determine a list of clarifying questions to present to the user based on the initial question. The server computer may also determine potential answers to the clarifying questions and peer recommendations.

Figure 6A:
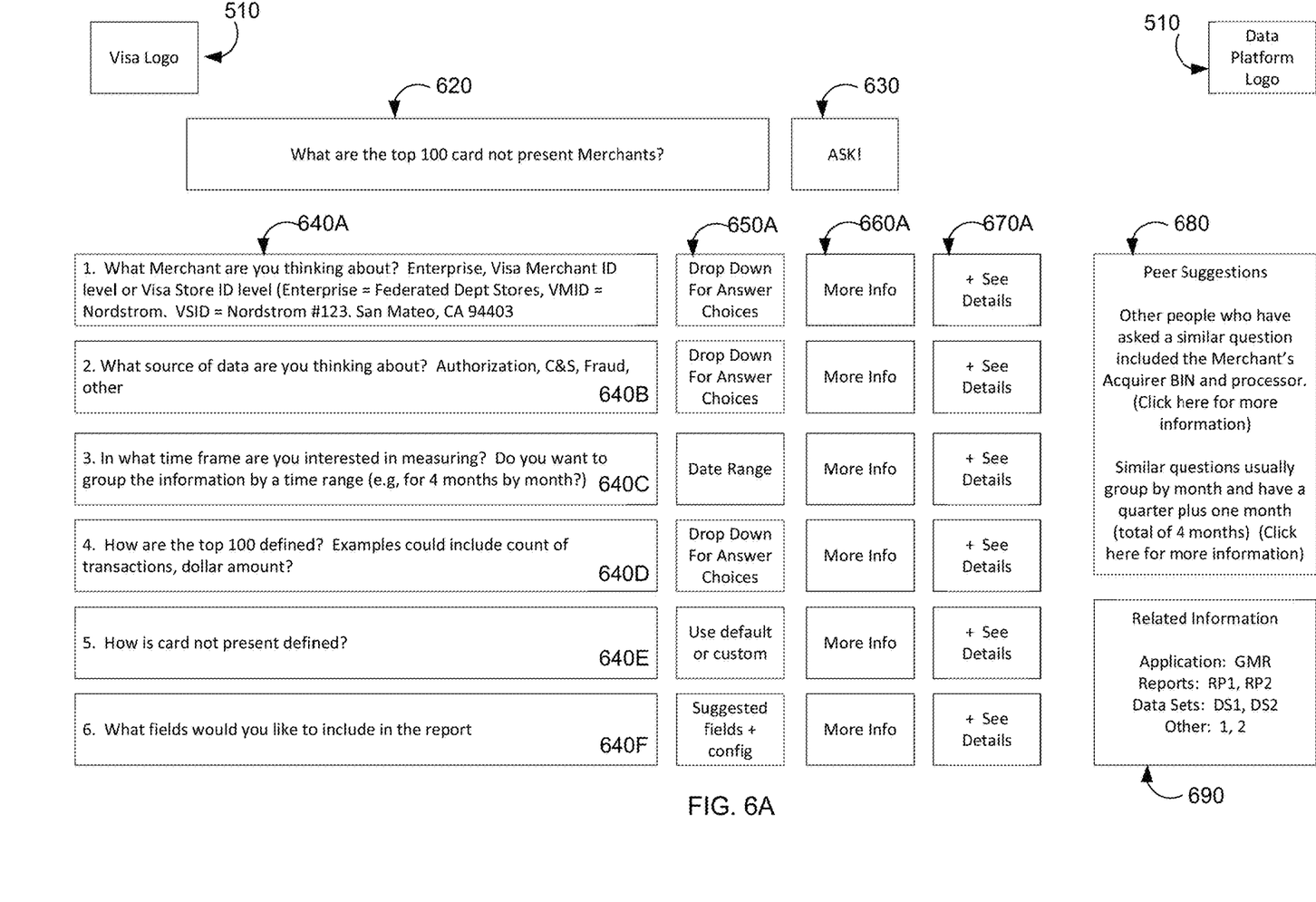
FIGS. 6A and 6B show wireframe diagrams of a question entry interface according to embodiments.
Figure 6B:
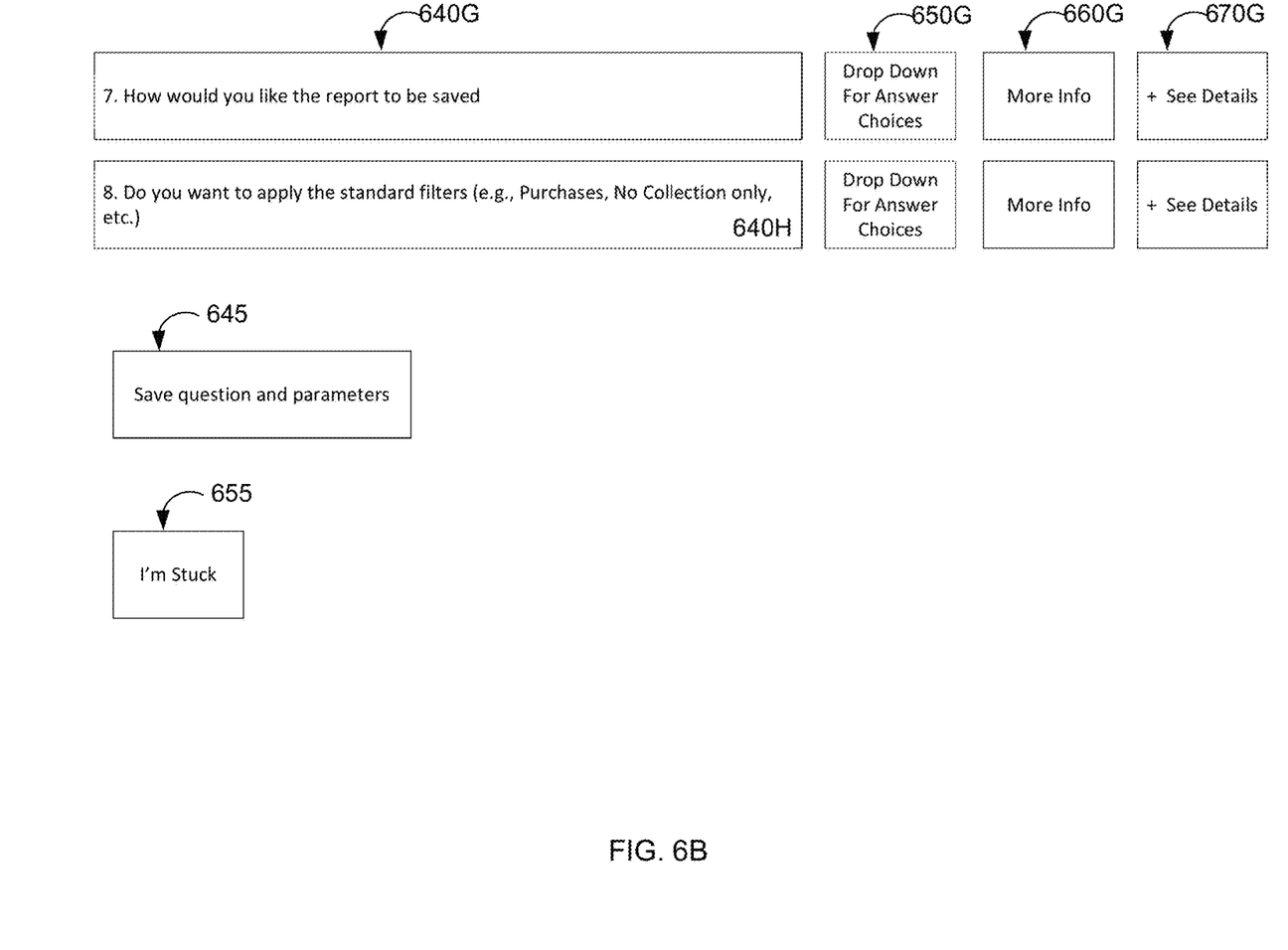

FIGS. 6A and 6B show a wireframe diagram of a user interface for entering clarifying answers to the clarifying questions. FIG. 6B shows a continuation of the wire frame of the user interface of FIG. 6A. The wireframe may comprise additional clarifying questions with associated blocks 640, 650, 660, and 670.

Block 620 may display the initial question asked by the user. In this example, the initial question is "What are the top 100 card not present merchants?" The user may be able to modify the initial question in block 620 or enter a new question. Button 630 can be used to enter the new question and restart the process.

Blocks 640A-H can show clarifying questions. Some clarifying questions, such as that in block 640E (e.g., "How is card not present defined?"), may only show the clarifying question. Other clarifying questions, such as that in block 640B (e.g., "What source of data are you thinking about?"), may also show potential answers or further explanatory details to the clarifying question (e.g., "Authorization, Clearing & Settlement, Fraud, other").

Blocks 650A-H can be data fields for the user to enter clarifying answers to the clarifying questions. The data fields may also display potential answers to the clarifying questions. In one embodiment, block 650A may display a drop down list of potential answers to the question "What merchant are you thinking about?" with options including, for example, "Enterprise", "Merchant ID", or "Store ID". For example, if the initial question mentions the merchant "Free People," the potential answers may include "Urban Inc.", the parent company of Free People, "Free People 1234", a merchant identifier associated with the merchant, and "Free People #6412 Los Angeles, Calif.", a store identifier associated with a particular retail location. The answers in the drop down list may or may not be those in the block 640A with the clarifying question. There may also be an option for a user to enter a clarifying answer that is not one of the potential answers.

Other blocks may present other formats of potential answers and clarifying answers. For example, block 650C may request that a user enter a date range in response to the clarifying question "In what time frame are you interested in measuring?" of block 640C. The user may be able to enter a date range by, for example, typing in dates or selecting dates on a calendar. Another example of an clarifying answer format may be shown in block 650E, where a user has an option between using default values or custom values. There may be, for example, radio buttons to select between the two options. If the user selects "custom," for example, additional data fields may be displayed to allow the user to enter a custom value.

Blocks 660A-H may display more information about a clarifying question and the potential answers. In some embodiments, selecting "More information" may open a pop up with additional context sensitive information such as valid values and definitions of terms. For example, selecting "More Information" for a clarifying question "What merchant are you thinking about?" as in block 650A may display definitions of the potential answers "Enterprise", "Merchant ID", and "Store ID".

Blocks 670A-H may display technical details about a clarifying question and the potential answers. Selecting "See details" may open a pop up with information about the natural language tokens, tables, and filter criteria associated with a clarifying question. For example, one clarifying question may be "What source of data are you thinking about?" as in block 640B. The information in associated block 670 may show the database or table associated with each potential answer (e.g., "Authorization", "Clearing & Settlement", "Fraud"). Block 670 may also indicate, for example, that the response to the clarifying question will be used to fill in a "WHERE" statement in an SQL database query to indicate a filter on a database search.

Block 680 may display peer suggestions related to clarifying questions that are presented to the user. The peer suggestions may be based on previous initial questions that were asked by other users. The peer suggestions may suggest potential clarifying answers and/or may suggest additional information that the user could add to the initial question. For example, one peer suggestion may state "Similar questions usually group by month and have a quarter plus one month (total of 4 months)" to provide assistance in answering clarifying question 640C ("In what time frame are you interested in measuring?"). Block 680 may also provide an option to present more information about the peer suggestion. For example, more information may include additional peer suggestions for the same clarifying question, more details about the peer suggestion, or information about how the peer suggestion was determined. More information may be displayed in block 680, for example, or in a popup window.

Block 690 may display related information about the initial question, the clarifying questions, and/or the peer suggestions. Related information may include information about an application, reports, and/or datasets. For example, block 690 can display reports that can be generated based on the initial question. The related information may also provide links to additional resources such as help sites, documentation, etc.

In addition to the clarifying questions, the user interface may comprise a block 645 that allows the user to save the initial question and parameters associated with the initial question. The parameters may be the clarifying questions and clarifying answers. The initial question and parameters may be saved as a report, and may be saved as a spreadsheet, a PDF, or some other document format. In some embodiments, the report may be saved to the user device. In other embodiments, a link may be sent to the user device (e.g., in an email, in a text message) providing access to the report. The user may then be able to use the report to resubmit or examine the initial question and clarifying questions at a later time, or to resend the same initial question and clarifying answers.

Block 655 allows the user to initiate communication with the assistant. When the user selects block 655, the initial question may be sent to the assistant computer. Parameters associated with the initial question, such as the clarifying questions and the clarifying answers may be sent to the assistant computer. Clarifying answers that have been partially entered may be sent to the assistant computer. The assistant may be notified when an initial question is received, such as by email, text message, push notification or phone call. Selecting block 655 may open a communication channel between the user device and the assistant computer. For example, a pop up chat window may appear on the user interface. The communication channel may allow the assistant to help the user answer the clarifying questions. Additionally, or alternatively, the assistant may answer the initial question directly.

Embodiments of the invention provide a number of advantages. Embodiments can help capture the information that would be used by a subject matter expert to answer an initial question. It has the advantage of the machine learning model to continuously revise the rules that are used to generate new rules and clarifying questions. Embodiments can send a list of clarifying questions, instead of one question at a time to slowly refine the answer to the question. This can allow embodiments to figure out ambiguities that might later become an issue. Embodiments can also provide a number of ways to facilitate the process for the user, such as providing potential answers and peer suggestions. Allowing integration with the assistant can allow the learning process can be partially supervised. In addition to using failed initial questions, it can use the results of the assistant's help to determine new ways to clarify ambiguous questions. Embodiments can improve human efficiency things, by replicating and automating the work of human experts. This can spread the range of expertise that the expert can give. Using the machine learning algorithms can increase efficiency as they can increase the number of questions that can be answered by the human expert.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer, an initial question comprising a plurality of words from a client computer;
   identifying, by the server computer, a set of words in the plurality of words;
   determining, by the server computer, a partial database query based on the set of words;
   identifying, by the server computer, a subset of the set of words based on the partial database query;
   determining, by the server computer, a list of clarifying questions, based on the subset of the set of words and a level of authentication of the client computer;
   presenting, by the server computer, the list of clarifying questions to the client computer;
   receiving, by the server computer, clarifying answers to at least some of the clarifying questions;
   generating, by a first machine learning model of the server computer, a new list of clarifying questions based on information stored in a log, wherein the log includes a set of positive and negative training examples that are associated with different sources used to answer previous initial questions;
   generating, by a second machine learning model of the server computer, a list of peer recommendations using information in the log;
   providing, by the server computer, the new list of clarifying questions and the list of peer recommendations to the client computer;
   obtaining, by the server computer, a response from the client computer with respect to the new list of clarifying questions;
   determining, by the server computer, an answer to the initial question based on the response; and
   presenting, by the server computer, the answer to the client computer.

2. The method of claim 1, further comprising:
   determining, by the server computer, a database query based on the partial database query, the clarifying answers, and the response.

3. The method of claim 2, wherein determining the answer to the initial question comprises querying a database with the database query.

4. The method of claim 3, wherein the database is part of a data warehouse.

5. The method of claim 1, further comprising:
   storing, by the server computer, the initial question, the clarifying answers, and the answer in the log.

6. The method of claim 1, wherein determining the answer to the initial question comprises:
   sending, by the server computer, the initial question to an assistant computer; and
   receiving, by the server computer from the assistant computer, the answer.

7. The method of claim 6, wherein sending the initial question to the assistant computer opens a communication channel between the assistant computer and the client computer.

8. The method of claim 1, further comprising:
   performing, by the server computer, authentication of the client computer; and
   determining, the list of clarifying questions based on the authentication.

9. The method of claim 1, wherein each word in the subset of the set of words is not included in the partial database query.

10. The method of claim 1, wherein the first machine learning model of the server computer is configured to process information in the log in response to a triggering condition being satisfied.

11. The method of claim 1 wherein the different sources are the server computer and an assistant.

12. A server computer comprising:
   a processor; and
   a computer-readable medium comprising computer code executable by the processor to implement a method comprising:
      receiving an initial question comprising a plurality of words from a client computer;
      identifying a set of words in the plurality of words;
      determining a partial database query based on the set of words;
      identifying a subset of the set of words based on the partial database query;
      determining a list of clarifying questions, based on the subset of the set of words and a level of authentication of the client computer;
      presenting the list of clarifying questions to the client computer;
      receiving clarifying answers to at least some of the clarifying questions;
      generating, by a first machine learning model, a new list of clarifying questions based on information stored in a log, wherein the log includes a set of positive and negative training examples that are associated with different sources used to answer previous initial questions;

generating, by a second machine learning model, a list of peer recommendations using information in the log;

providing the new list of clarifying questions and the list of peer recommendations to the client computer;

obtaining a response from the client computer with respect to the new list of clarifying questions;

determining an answer to the initial question based on the response; and presenting the answer to the client computer.

13. The server computer of claim 12, wherein the initial question is in natural language.

14. The server computer of claim 12, wherein the method further comprises:

determining potential answers to the clarifying questions; and presenting the potential answers to the client computer with the clarifying questions.

15. The server computer of claim 14, wherein determining the potential answers includes querying a reference database.

16. The server computer of claim 12, wherein the initial question is entered by a speech recognition program.

17. The server computer of claim 12, wherein the client computer is authenticated before receiving the initial question.

18. The server computer of claim 12, wherein determining the list of clarifying questions further comprises querying a rules database, wherein the rules database has rules for clarifying questions associated with one or more of the subset of the set of words.

19. The server computer of claim 18, further comprising updating the rules database based on the initial question.

20. A computer product comprising non-transitory computer readable medium storing a plurality of instructions for controlling a computer system to perform operations comprising:

receiving, by a server computer, an initial question comprising a plurality of words from a client computer;

identifying, by the server computer, a set of words in the plurality of words;

determining, by the server computer, a partial database query based on the set of words;

identifying, by the server computer, a subset of the set of words based on the partial database query;

determining, by the server computer, a list of clarifying questions, based on the subset of the set of words and a level of authentication of the client computer;

presenting, by the server computer, the list of clarifying questions to the client computer;

receiving, by the server computer, clarifying answers to at least some of the clarifying questions;

generating, by a first machine learning model of the server computer, a new list of clarifying questions based on information stored in a log, wherein the log includes a set of positive and negative training examples that are associated with different sources used to answer previous initial questions;

generating, by a second machine learning model of the server computer, a list of peer recommendations using information in the log;

providing, by the server computer, the new list of clarifying questions and the list of peer recommendations to the client computer;

obtaining, by the server computer, a response from the client computer with respect to the new list of clarifying questions;

determining, by the server computer, an answer to the initial question based on the response; and presenting, by the server computer, the answer to the client computer.

\* \* \* \* \*